United States Patent [19]

Ikeda et al.

[11] 3,985,661

[45] Oct. 12, 1976

[54] LUBRICANT-CONTAINING POLYMERIC SYNTHETIC RESIN COMPOSITION AND PROCESS FOR PREPARING SAID COMPOSITION

[75] Inventors: Hirosaka Ikeda; Masaki Ishikawa, both of Itami, Japan

[73] Assignee: Sumitomo Electric Industries, Ltd., Osaka, Japan

[22] Filed: June 27, 1974

[21] Appl. No.: 483,505

[30] Foreign Application Priority Data
June 27, 1973 Japan.............................. 48-72653
June 27, 1973 Japan.............................. 48-72655

[52] U.S. Cl................................ 252/12; 252/12.4; 252/12.6
[51] Int. Cl.$^2$..................... C10M 5/00; C10M 7/00; F16D 69/00
[58] Field of Search.................... 252/12, 12.2, 12.4, 252/12.6

[56] References Cited
UNITED STATES PATENTS
3,779,918  12/1973  Ikeda et al............................ 252/12

Primary Examiner—D. Horwitz
Assistant Examiner—I. Vaughn
Attorney, Agent, or Firm—Sughrue, Rothwell, Mion, Zinn and Macpeak

[57] ABSTRACT

A lubricant-containing synthetic resin composition, prepared by pre-mixing 2 to 40% by volume of a lubricant consisting of at least one lubricant oil and/or at least one oilinessincreasing agent, with at least one carrier which is an organic or inorganic powder having a melting point higher than the molding temperature of a base synthetic resin, a specific surface area of at least 0.3 m$^2$/g and a limited amount of oil absorbed of at least 0.2 cc/carrier cc, and then mixing the mixture with the base synthetic resin, or mixing the lubricant, carrier and base synthetic resin simultaneously, and then molding the resulting mixture, the amount of the lubricant being not more than 10.0 times the limit amount of oil absorbed by the carrier.

25 Claims, 4 Drawing Figures

LUBRICANT-CONTAINING POLYMERIC SYNTHETIC RESIN COMPOSITION AND PROCESS FOR PREPARING SAID COMPOSITION

BACKGROUND OF THE INVENTION

1. Field of the Invention

This invention relates to a lubricant-containing polymeric synthetic resin composition and a process for preparing it.

2. Description of the Prior Art

Polyamides, polyacetal, polycarbonate and tetrafluoroethylene resins, etc. have previously been used as wear resistant or lubricious plastic materials. These materials are fully serviceable under low loads and at low velocities even in the absence of lubricant supply, but as the load and the velocity become higher, burning and flow occur because of the heat of friction and the materials become useless. Polytetrafluoroethylene has a very low coefficient of friction and undergoes great wear because of a low compression stress. However, when a filler such as glass fibers, asbestos, mica, graphite, lead or lead oxide is incorporated in the polytetrafluoroethylene, its resistance to load is increased, and its wear resistance in the absence of lubricant supply becomes superior. However, such a filled polytetraethylene is very expensive.

In order to improve the wear resistance of cheap polyamides, polyacetal or polycarbonate resins, attempts have been made to fill solid lubricating agents, such as graphite, molybdenum sulfide or a polytetrafluoroethylene powder, in these resins, and some improvement has been attained.

However, in this attempt of incorporating a solid lubricant, the increase in wear resistance under high loads and at high velocities is only slight.

On the other hand, it is well known that in contrast to the absence of lubricant supply, when a lubricant is supplied, the coefficient of friction of the plastic material is reduced to at least 1/10 by the action of the lubricant, and its wear resistance is markedly increased. However, this requires a lubricating mechanism, and the cost inevitably becomes higher because of such an accessory. On the other hand, as regards a metallic material, a sintered porous lubricant-containing bearing obtained by impregnating a lubricant in the bearing itself has been used, and synthetic resins processed somewhat in this way have also been used. However, synthetic resin powders are expensive, and the production of these powders is expensive and gives molded articles of very poor strength with poor moldability.

SUMMARY OF THE INVENTION

An object of this invention is to remove these defects of the prior art, and markedly enhance the lubricity and wear resistance of a polymeric synthetic resin composition at low cost and with good moldability.

Another object of this invention is to provide a lubricant-containing polymeric synthetic resin composition having superior lubricity, wear resistance and fire retardancy.

Still another object of this invention is to provide a lubricant-containing polymeric synthetic resin composition having lubricity, wear resistance and antistatic property, or a lubricant-containing polymeric synthetic resin composition having lubricity, fire retardancy and antistatic property.

A further object of this invention is to prevent the deterioration of the properties of the base plastics and the reagents due to oxidation which may occur at the time of imparting lubricity, fire retardancy and antistatic property.

BRIEF DESCRIPTION OF THE DRAWINGS

The drawings are views showing the rotating direction of a multiaxial rotor,

FIG. 1 and FIG. 3 indicate the rotation in different directions, and

FIG. 2 and FIG. 4 indicate the rotation in the same direction.

DESCRIPTION OF THE PREFERRED EMBODIMENT

Figure 1:
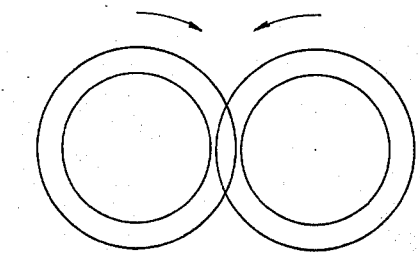
FIG. 1 and FIG. 2 showing a biaxial rotor and FIG. 3 and FIG. 4 showing a triaxial rotor.
Figure 2:
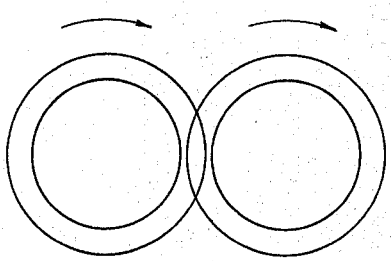
Figure 3:
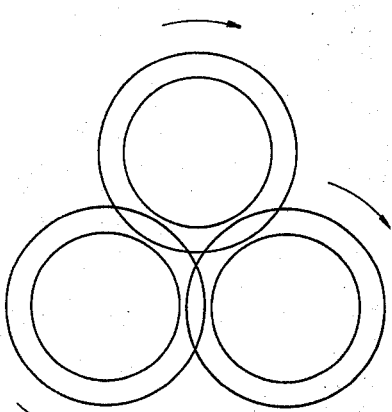
Figure 4:
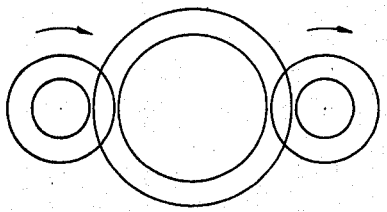

We obtained a lubricant-containing plastic composition using a lubricant absorbent carrier having a specific surface area of at least 0.01 $m^2/g$, as disclosed in U.S. Pat. application Ser. No. 821,626, now U.S. Pat. No. 3,779,918, filed May 5, 1969 and entitled "LUBRICANT-CONTAINING POLYMERIC SYNTHETIC RESIN COMPOSITION". Further investigations have now led to a lubricant-containing plastic composition having markedly improved properties. This will be described in detail below.

In U.S. Pat. application Ser. No. 821,626, a lubricant-containing plastic composition is obtained by mixing a lubricant with a carrier having a specific surface area of at least 0.01 $m^2/g$, and kneading the resulting mixture with a base plastic. We have made studies in order to find out a simplified process by which a lubricant, an oiliness-increasing agent, a fire retardant, an antistatic agent, an antioxidant, a carrier and a base plastic can be mixed and kneaded simultaneously or separately without consequent changes in properties. As a result, we have found that by causing an organic or inorganic powder having a melting point higher than the molding temperature of a base synthetic resin to be present together with the base synthetic resin and a lubricant, the lubricant can be incorporated into the base synthetic resin without separation.

Desirably, the organic or inorganic powder carrier used should be as fine as possible, and have a specific surface area of at least 0.3 $m^2/g$, desirably at least 0.9 $m^2/g$, and preferably at least 3 $m^2/g$. Powders having a surface area of less than 0.3 $m^2/g$ have the defect that large particles are dispersed in the base plastics and the surface condition of the molded articles is poor. Furthermore, if the specific surface area is small, the critical oil absorption is low and thus, a larger quantity of the carrier must be used, which in turn causes a reduction in strength.

The especially important point here is the ratio of the organic or inorganic powder to the lubricant, and this ratio can be shown by the ratio of the amounts of oil absorbed. The "amount of oil absorbed", as referred to herein, has almost the same meaning as is shown in JIS K-5101. In the present invention, this amount was measured at 20° C when the melting point of the lubricant is not more than 0° C, and at the melting point plus 20° C when the melting point of the lubricant exceeds 0° C.

The unit of the amount of oil absorbed is $A = $ lubricant cc/carrier cc.

The term "lubricant", as used herein, denotes a composition consisting mainly of a lubricant oil having a melting point lower than the molding temperature of the base plastic and an oiliness-increasing agent, and optional ingredients such as a fire retardant, an antistatic agent and an antioxidant.

The limit value of the amount of the lubricant to be incorporated is expressed as follows in relation to A above.

$$B \leq 10.0A,$$

preferably $$B \leq 5.0A \text{ lubricant cc/carrier cc.}$$

When B exceeds 10.0A, the separation of the lubricant occurs at the time of molding.

The carrier used should have as large an A value as possible, and it is at least 0.2 cc/cc, desirably at least 0.6 cc/cc. If the A value is less than 0.2 cc/cc, the lubricant tends to be separated, and the amount of the carrier is large as compared with the lubricant. This results in the impairment of an increase in thermal stability required of a sliding member.

The suitable amount of the lubricant is 2 to 40% by volume, desirably 5 to 25% by volume, of the entire composition. If it is less than 2%, there is little wear resistant effect. If it is above 40%, the strength is markedly reduced, and the wear resistance is also reduced.

By the above-described method, oil incorporation can be performed stably and easily. For example, the following are possible according to this method.

1. It is possible to feed a base plastic, a carrier and a lubricant simultaneously into a mixer provided with rotating blades, mix them therein, and molding the mixture at the molding temperature of the base plastic.

2. In the procedure (1) above, the lubricant can be an optional combination of a lubricant oil, an oiliness-increasing agent, a fire retardant, an antistatic agent and an antioxidant, and mixing can be effected in the same way.

3. First, some of a lubricating oil, an oiliness-increasing agent, a fire retardant, an antistatic agent and an antioxidant are mixed, and then the mixture was further mixed with the remainder of these.

When the above-described base plastic, carrier and lubricant are melted and kneaded in a cylinder of a monoaxial screw molding machine, it is difficult to perform sufficient mixing and dispersing between the lubricant and the resin. Since the polymer is not compatible with the lubricant, after the polymer has been swollen with the lubricant, the remainder of the lubricant beyond the amount used for swelling is adsorbed to the surface of the carrier or absorbed therein. However, a part of the lubricant separates from the interior of the polymer, and thus separates from the polymer melted within the cylinder and the carrier, after which it begins to decompose. Furthermore, the separated lubricant adheres to the screw and the cylinder wall, and causes slippage in a shearing action between the cylinder wall and the molten polymer which is a melt-flow mechanism in a monoaxial screw. This results in the failure of the shearing action, and the molten polymer remains coiled around the screw and has difficulty of advancing to the forward portion of the cylinder. This makes it difficult to knead and extrude the polymer. Thus, when a mixture of a base polymer such as polyacetal, a lubricant such as a paraffinic mineral oil and a carrier is molded using a monoaxial screw-type extruder or injection molding machine, it is difficult to obtain a lubricant-containing composition with a uniform lubricant content, and the dispersion of the amount of the lubricant contained in the composition tends to occur.

In view of this, our investigations were directed to the preparation of a w/o type emulsion by mixing and dispersing incompatible substances. If a w/o-type emulsion is intended, even substances having no compatibility with each other can be thoroughly mixed. When a molten polymer and a lubricant oil are stirred in a beaker just as in the case of water, an oil and a surface active agent, they are sufficiently dispersed and can be stably maintained as a w/o type emulsion. We have found that if this emulsion preparation is performed on a commercial scale using a kneader having a great stirring effect in which the melt flow between the cylinder and the screw does not rely on the shearing action between the cylinder wall and the molten polymer or is little affected by such a shearing action, the separation and adhesion of a small amount of lubricant to the cylinder wall does not cause the polymer to be coiled around the screw, but the polymer can be transferred to the forward portion of the cylinder. We have found that a multi-axial extruder having at least two axes or a mixing machine in which mixing is effected between two or more rotors, such as a Bambury mixer or calender roll can be used as such as kneader. With open kneaders, the dissipation of the lubricant and the oxidation of the molten polymer and the lubricant by air are prone to occur, and therefore, it is desirable to use closed kneaders.

It has also been found that in order to obtain w/o emulsions, the use of kneaders of the structure in which two rotors mesh each other is preferred, and it is especially preferred to employ kneaders in which two rotors (or screws) rotate in different directions (see the Drawings) because such a kneader exhibits a reduced shearing action and ensures good stirring effects, thus making it possible to include a lubricant in a higher content stably. It has been found that the speed of rotation of the kneader should be at least 7 rpm, preferably at least 20 rpm. If it is less than 7 rpm, the separation of the lubricant occurs. In commercial practice, a continuous-type is naturally more desirable than a batch-type. In the most preferred embodiment, the use of a multiaxial screw-type extruder with screws rotating in different directions makes it possible to include 2 to 40% by volume of lubricant. A vent is preferably provided in the extruder, but even in the absence of vent, the extruder is fully serviceable. Desirably, the ratio of the length (L) to the diameter (D) of the screw (L/D) is at least 20, preferably at least 25.

The master batch method can also be used in this invention, whereby high lubricant-content pellets are produced by the method described above, and dry blended in any desired proportions with an original base plastic not containing the lubricant. According to this method, the heat cycle of the base plastic on the whole can be reduced to prevent deterioration in properties, and a lubricant-containing plastic composition can be produced commercially.

The carrier used in this invention is considered to play a role of a surface active agent when a water-in-oil emulsion is prepared and stabilized.

The base plastic used in this invention is at least one thermoplastic synthetic resin such as polyethylene, polypropylene, acrylonitrile/butadiene/styrene copolymer, polycarbonate, polyacetal, polyamides, polyphenylene oxide, polybutylene terephthalate, polyethylene terephthalate, polyphenylene sulfide, or polystyrene.

The carrier used is a powder of at least one of the following organic or inorganic substances.

1. Organic substances

1. Synthetic resins

Polyamides, polytetrafluoroethylene, polycarbonate, phenol resins, epoxy resins, diallyl phthalate resins, etc.

2. Inorganic substances

1. Carbons such as carbon black, graphite or activated carbon.
2. Finely divided powders consisting as major components of calcium carbonate, basic magnesium carbonate, clay, talc, silica, silicates, mica, quartz, diatomaceous earth, asbestos, aluminum hydroxide, alumina, or acid clay, etc.
3. Metal oxides such as lead oxide, titanium oxide, or copper oxide.
4. Metal nitrides such as titanium nitride or boron nitride.
5. Metal powders such as iron, copper or aluminum.
6. Sulfides such as $MoS_2$.

The lubricant can be selected from a wide range of mineral oils such as spindle oil, refregerator oil, dynamo oil, turbine oil, machine oil, cylinder oil or gear oil, greases, and synthetic oils such as hydrocarbons, esters, polyglycols, polyphenyl ethers, silicone oils, or halocarbon-type synthetic oils.

Furthermore, as an oiliness-increasing agent, a saturated fatty acid, an unsaturated fatty acid, a fatty acid ester, an aliphatic amide, a metal soap and a higher alcohol can be used either alone or in admixture with each other together with at least one of the mineral oils, synthetic oils and greases.

Some examples of the oiliness-increasing agent are as follows:

1. Saturated fatty acids

Capric acid, undecanoic acid, lauric acid, myristic acid, palmitic acid, stearic acid, arachic acid, behenic acid, lignoceric acid, cerotic acid, montanic acid, or melissic acid.

2. Unsaturated fatty acids

Linderic acid, tsuzuic acid, physeteric acid, myristoleic acid, 9-palmitoleic acid, petroselinic acid, oleic acid, elaidic acid, gadoleic acid, gondoic acid, wheal oil acid, erucic acid, brassidic acid, selacholeic acid, tallilic acid, xymenic acid, linoleic acid and linveraisic acid.

3. Fatty acid esters

An ester of methyl, ethyl, propyl, butyl, amyl, hexyl, heptyl, octyl, decyl, cocyl, contyl, or oleyl alcohol, etc. and a saturated fatty acid such as acetic acid, caproic acid, enantoic acid, caprylic acid, pelargonic acid, undecanoic acid, lauric acid, myristic acid, palmitic acid, stearic acid, lignoiceric acid, cerotic acid, montanic acid or merysic acid, or unsaturated fatty acid such as petroceric acid, an oleic acid, eraidic acid, linolic acid, linolenic acid, araxydic acid, prasidic acid, ercaic acid, or lisinoleic acid, etc. And also a dibasic fatty acid ester, a glycidyl ester, etc.

4. Fatty acid amides

Octylamide, decylamide, laurylamide, myristylamide, palmitylamide, stearylamide, eicosylamide docosylamide, etc.

5. Metal soaps

Soaps formed between stearic acid, oleic acid, palmitic acid, laurate acid, etc. and metals such as Li, Be, Mg, Ca, Sr, Cu, Zn, Cd, Al, Ce, Ti, Zr, Pb, Cr, Mn, Co, Ni, Fe, Hg, Ag, Tl or Sn.

6. Higher alcohols

Octyl, lauryl, cetyl, stearyl or oleyl alcohols.

The fire retardant may be in the form of either liquid or powder at the molding temperature of the synthetic resin. Examples of the fire retardant are:

1. Phosphoric acid esters

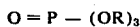

$$O = P - (OR)_3$$

Tris-dichloropropyl phosphate, tris-2-chloroethyl phosphate, tributoxy ethyl phosphate, trimethyl phosphate, triethyl phosphate, tributyl phosphate, trioctyl phosphate, trischloroethyl phosphate, triphenyl phosphate, tricresyl phosphate, trixylenyl phosphate, cresyl diphenyl phosphate, diphenyl mono-o-pylenyl phosphate, octylphenyl phosphate, phenyldichloropropyl phosphate, phenyl dichloroethyl phosphate, octyl dichloroethyl phosphate, octyl dichloropropyl phosphate, isopropyl acid phosphate, butyl acid phosphate, dibutyl acid phosphate, octyl acid phosphate, dioctyl acid phosphate, isodecyl acid phosphate, monoisodecyl phosphate, tridecanol acid phosphate, trilauryl triphosphate, trilauryl phosphate, tris-nonylphenyl phosphate, or dibutylhydrogen phosphate.

2. Halogenated aliphatic hydrocarbons

Dibromotetrachloroethane, tetrabromoethane, tetrabromobutane, or chlorinated paraffin.

3. Halogenated aromatic hydrocarbons

Chlorinated or brominated aromatics, such as hexabromobenzene or pentabromobenzene.

4. Halogenated alicyclic hydrocarbons

Hexabromocyclododecane.

5. Organotin compounds

6. Reactive type fire retardants.

Tetrachlorophthalic anhydride, tetrabromophthalic anhydride, tetrabromo bisphenol A, bis-$\beta$-chloroethyl vinyl phosphate, tribromophenyl allyl ether, tribromophenol, tribromoaniline dibromopropanol, and bisphenol S.

7. Inorganic compounds

Aluminum hydroxide, sodium borate, antimony oxide, talc, and calcium bicarbonate. These inorganic compounds are desirably used in intimate admixtures with the compounds 1 to 6 mentioned above.

The above-exemplified fire retardants may be used alone or in admixture of at least two of them with each other.

Examples of the antioxidant are as follows:

1. Phenolic compounds 1,1-bis(4-hydroxyphenyl)-cyclohexanestyrenated phenol,
2,6-di-tert.-butyl-4-methylphenol,
4,4'-thiobis-(6-tert.-butyl-3-methylphenol),
2,2'-methylene-bis(6-tert.-butyl-4-methylphenol),
4,4'-butylidene-bis-(6-tert.-butyl-3-methylphenol), α- or β-naphthol,
dibutyl-p-cresol,
methylene-di-naphthol,
4-isooctylphenol,
3-methyl-2,6-di-tert.-butyl-phenol,
2-methylphenol,
4-t-butylphenol,
2,6-dimethylphenol,
4-t-butyl-2-methylphenol,
4-t-octyl-2-methylphenol,
2,4-di-sec.-amylphenol,
2,4-di-t-amylphenol,
2,4-dimethyl-6-t-butylphenol,
2,6-di-t-butyl-4-methylphenol,
2,4-6-tri-t-butylphenol, and
4,6-di-t-butyl-2-methylphenol.

2. Amines

N,N'-di-sec.-butyl-p-phenylenediamine, tetramethyl-diaminodiphenylmethane,
phenyl-α-naphthylamine,
phenyl-β-naphthylamine,
1,3-diphenyl-2-propyl-tetrahydroxylamine,
N,N'-di-β-naphthyl-p-phenylenediamine,
N,N'-diphenyl-p-phenylenediamine,
N,N'-diallyl-p-phenylenediamine,
N-phenyl-N-isopropyl-p-phenylenediamine,
a polymer of 2,2,4-trimethyl-1,2-dihydroquinoline,
6-ethoxy-2,2,4-trimethyl-1,2-dihydroquinoline,
N-phenyl-1-naphthylamine,
N-phenyl-2-naphthylamine,
N-1-propyl-N'-phenyl-p-phenylenediamine, and
N-1-phenyl-N'-cyclohexyl-p-phenylenediamine.

3. Hydroxy and trihydroxybenzenes 4-t-butyl-pyrocatechol,
2,5-di-t-butylquinone, and
2,4,5-trihydroxybutyrophenone.

4. Benzaphenones 2,2'-dihydroxy-4,4'-dimethoxybenzophenone,
2-hydroxy-4-methoxy-benzophenone,
2,2'-dihydroxy-4-methoxy-benzophenone,
2,4-dihydroxy-4-octoxy-benzophenone, and
2,4-dihydroxy-benzophenone.

5. Sulfur compounds 4-t-butyl thiocresol,
dilauryl-3,3'-thiodipropionate,
4,4'-thiobis-(6-t-butyl-2-methylphenol),
dilauryl thiopropionate,
2-mercaptobenzimidazole, and
distearyl-3,3'-thiodipropionate.

6. Organophosphorus compounds triphenyl phosphite,
tris-nonylphenol phosphite,
alkylaryl phosphites, and
tri-n-butyl phosphite.

As an antioxidant promotor, thiourea, its derivatives, thioacids, thioamides, mercaptopyridine or pyrimidine derivatives, etc. can be used in combination with the antioxidant. The above antioxidants may be used either alone or in admixture of at least two of them with each other.

Examples of the antistatic agent are:

1. Anionic compounds

Salts of carboxylic acids, sulfonic acid, higher alcohol sulfate esters, aliphatic sulfonic acid phosphoric acid esters, etc.

2. Cationic compounds

Salts of primary, secondary, tertiary or quaternary amines, for example, nitric acid salt of stearamide propyl dimethyl-β-hydroxyethyl ammonium.

3. Amphoteric compounds

Amino acids, carboxylic acids, sulfate ester salts.

4. Nonionic compounds

Polyalkylene ether adducts of carboxylic acids, alcohols or phenol of the alkyl ether type, alkyl ester type or polyethylene imine type, polyalkylene ether adducts of polyamides, or acid amides.

5. Inorganic compounds

Carbon black, $CaF_2$, $CaCO_3$, or metal fibers. Examples of the metal fibers are fibers of stainless steel or copper with a diameter of several microns to several ten microns.

These antistatic agents can be used either alone or in admixture of at least two of them with each other.

The base synthetic resin used in this invention may contain glass fibers, carbon fibers, or metal fibers incorporated therein in advance, or at the time of blending or extruding.

The sliding devices to be produced from the resin composition of this invention include, for example, light electrical appliance parts such as bearings, cams, gears or rollers which have a slippery surface. These devices can be produced by injection molding or extrusion molding.

The present invention will now be illustrated with reference to the following Examples, but they are not to be construed as limiting the scope of this invention.

EXAMPLE 1

3.5% by volume of activated carbon having a specific surface area of 1015 m²/g and a limited amount of oil absorbed of 5.7 cc/cc, 7% by volume of a paraffinic lubricant oil (Ro 2500, a product of Maruzen Oil Co., Ltd.), and 89.5% by volume of polybutylene terephthalate (PBT) (G1030, a product of Toyo Spinning Co., Ltd.) containing 30% by weight of glass fibers were simultaneously mixed in a mixer including rotating blades, and the mixture was molded using a 32 mm-diameter screw type injection molding machine.

For comparison, G 1030 alone was molded in the same manner as above, and the properties of the molded article are shown in Table 1 (Comparative Example 1).

It is seen that the tensile strength of the molded article was somewhat reduced, but the bearing performance and the amount of wear of the molded article increased markedly.

EXAMPLE 2

In Example 1, the kneading was performed using a biaxial screw with a screw diameter of 30 mm and an L/D ratio of 28 and adapted to be rotated in different directions. The screw was operated at a speed of 60 rpm, and the temperature of the part below the hopper was maintained at 150° C, and that of the cylinder portion at 200° C. The mixture was extruded into an article having a diameter of 3 mm, and then cooled with water. The mixture obtained was cut by a pelletizer to form pellets. At this time, there was no separation of the lubricant. The pellets were molded by a screw-type injection molding machine.

The properties of the molded article are shown in Table 1. The properties of the molded article were found to be further improved over those of the molded article obtained in Example 1 using a monoaxial screw. This is considered to be due to the reduction in the dispersion of the amount of the lubricant and the oxidation of the lubricant as compared with the case of using the monoaxial screw.

EXAMPLE 3

Example 2 was repeated except that 7% by volume of stearic acid was used instead of the lubricant Ro 2500. The properties of the molded article are shown in Table 1.

EXAMPLE 4

Example 2 was repeated except that 4% by volume of Ro 2500 and 3% by volume of stearic acid were used instead of 7% by volume of Ro 2500. The results are shown in Table 1.

EXAMPLE 5

Example 2 was repeated except that 7% by volume of stearyl alcohol was used instead of Ro 2500. The results are shown in Table 1.

EXAMPLE 6

Example 2 was repeated except that nylon 66 (CM 3001N, a product of Toray Industries, Inc.) was used instead of the polybutylene terephthalate and the amount of the activated carbon was changed to 2.33% by volume.

For comparison, CM3001N alone was molded in the same way as in Example 2 (Comparative Example 2).

The results are shown in Table 1. It is seen from the result that the wear resistance of the molded article obtained in this Example was markedly increased.

EXAMPLE 7

Example 2 was repeated except that nylon 6 (CM 1001 G, a product of Toray Industries, Inc.) containing 30% by weight of glass fibers was used instead of the polybutylene terephthalate, 5% by volume of calcium carbonate having a specific surface area of 31 m$^2$/g and a limited amount of oil absorbed of 2.14 cc/cc was used instead of the activated carbon, and the amount of the lubricant Ro 2500 was changed to 10% by volume. The results are shown in Table 1. As Comparative Example 3, CM 1001 G alone was molded in the same way, and the results are also shown in Table 1.

EXAMPLE 8

Example 2 was repeated except that polycarbonate (S-2000, a product of Mitsubishi-Edogawa Chemical Co., Ltd.) was used instead of the polybutylene terephthalate, 2% by volume of MoS$_2$ having a specific surface area of 8 m$^2$/g and a limited amount of oil absorbed of 1.3 cc/cc was used as a carrier, and the amount of the lubricant Ro 2500 was changed to 5% by volume. As Comparative Example 4, S-2000 alone was molded in the same way as above. The results are shown in Table 1.

EXAMPLE 9

Example 2 was repeated except that nylon 12 (Diamide, a product of Dicell Company) was used instead of the polybutylene terephthalate, 2.5% by volume of carbon black having a surface area of 170 m$^2$/g and a limited amount of oil absorbed of 2.3 cc/cc was used instead of the activated carbon, and as the lubricant, 7% by volume of silicone oil was used. As Comparative Example 5, only the Diamide was molded, and the properties of the molded article were measured. The results are shown in Table 1.

Table 1

| Samples | Tensile Strength (Kg/cm$^2$) | PV Value of Bearing * (Kg/cm$^2$ × m/min) | Amount of Wear ** (mm) |
|---|---|---|---|
| Comparative Example 1 | 800 | 25 | Burned |
| Example 1 | 510 | 300 | 4.2 |
| Example 2 | 710 | 400 | 3.5 |
| Example 3 | 650 | 300 | 3.8 |
| Example 4 | 650 | 420 | 3.5 |
| Example 5 | 600 | 300 | 3.9 |
| Comparative Example 2 | 786 | — | 7.5 |
| Example 6 | 565 | — | 3.3 |
| Comparative Example 3 | 1100 | — | Burned |
| Example 7 | 780 | — | 3.2 |
| Comparative Example 4 | 590 | — | Burned |
| Example 8 | 530 | — | 6.5 |
| Comparative Example 5 | 450 | — | Burned |
| Example 9 | 350 | — | 3.8 |

Note:
* The PV value of bearing is defined by pressure × velocity (Kg/cm$^2$ × m/min) which shows the limit at which burning does not occur when a bearing having an inside diameter of 10 mm, an outside diameter of 14 mm and a length of 10 mm is rotated at varying peripheral speeds and under varying loads without the supply of lubricant.
** The amount of wear is defined by the amount of wear caused to a test piece without the supply of lubricant at a speed of 3.62 m/sec and under a load of 19.8 Kg using an iron disc having an outside diameter of 30 mm and a thickness of 3 mm. The burning indicates that the sample undergoes melt flow because of the heat of sliding during the test, so that the measurement of the amount of wear becomes impossible.

EXAMPLE 10

Example 2 was repeated except that polyacetal copolymer (Duracon M90-02, product of Polyplastic Co., Ltd.) was used as the base plastic, and as the carrier, 4% by volume of low pressure polyethylene (Hizex Million, a product of Mitsui Petrochemical Industries, Ltd.) having a specific surface area of 1.3 m$^2$/g and a limited amount of oil absorbed of 0.7 cc/cc and 15% by volume of Ro 2500 were used. As Comparative Example 6, only M90-02 was molded in the same way. The results are shown in Table 2.

EXAMPLE 11

Example 10 was repeated except that turbine oil (special A 180, a product of Maruzen Oil Co., Ltd.) was used instead of the lubricant Ro 2500. The results are shown in Table 2.

Table 2

| Samples | Tensile Strength (Kg/cm$^2$) | PV Value of Bearing (Kg/cm$^2$.m/min) | Amount of Wear (mm) |
|---|---|---|---|
| Comparative Example 6 | 574 | 55 | Burned |
| Example 10 | 372 | 1800 | 2.9 |

Table 2-continued

| Samples | Tensile Strength (Kg/cm$^2$) | PV Value of Bearing (Kg/cm$^2$.m/min) | Amount of Wear (mm) |
|---|---|---|---|
| Example 11 | 340 | 1800 | 3.2 |

EXAMPLES 12 AND 13 AND COMPARATIVE

EXAMPLES 7 AND 8

Example 10 was repeated except that the amounts of Hizex Million and Ro 2500 were changed as shown in Table 3. The results are also shown in Table 3.

Table 3

| Samples | Amounts Hizex Million (vol.%) | Ro 2500 (vol.%) | Tensile Strength (Kg/cm$^2$) | PV Value of Bearing (Kg/cm$^2$.m/min) | Amount of Wear (mm) | Injection Moldability |
|---|---|---|---|---|---|---|
| Comparative Example 7 | 0.5 | 1.5 | 540 | 60 | Burned | Good |
| Example 12 | 1 | 3.0 | 520 | 100 | 8.5 | Good |
| Example 13 | 12 | 35.0 | 230 | 600 | 4.8 | Good, the oil adhered to the surface of the mold |
| Comparative Example 8 | 18 | 42.0 | 150 | — | 5.9 | Poor, bad surface condition |

It is seen from the above table that if the amount of the lubricant oil is less than 2%, the wear resistance of the molded article is poor, and if it exceeds 40%, there is a marked reduction in strength, and at the same time, the wear resistance is reduced and the moldability becomes poor.

COMPARATIVE EXAMPLES 9 TO 11

Example 10 was repeated except that the specific surface area, the limited amount of oil absorbed, and B value of the polyethylene were changed as shown in Table 4. The results obtained are shown in Table 4.

It is seen from Table 4 that when the B value exceeds 10, the lubricant oil separates during extrusion by means of a biaxial screw, and that if the A value is less than 0.2, the strength is reduced remarkably, and the surface condition of the molded product is poor. Furthermore, if the specific surface area is smaller, the A value also becomes smaller.

Table 4

|  | Example 10 | Comparative Example 9 | Comparative Example 10 | Comparative Example 11 |
|---|---|---|---|---|
| Amount of carrier (vol. %) | 4 | 2 | 12 | 25 |
| Specific surface area (m$^2$/g) | 1.3 | 1.3 | 0.4 | 0.25 |
| Limited amount of oil absorbed (A value; cc/cc) | 0.7 | 0.7 | 0.18 | 0.10 |
| Amount of lubricant incorporated (vol. %) | 15 | 15 | 15 | 15 |
| B value | 5.35 | 10.7 | 6.4 | 6.0 |
| Tensile strength (Kg/cm$^2$) | 372 | — | 215 | 190 |
| Mixing by biaxial extrusion | Good | Oil separates | Good | Good |
| Moldability | Good | Oil separates | Good but surface condition poor | Good but surface condition poor |

EXAMPLES 14 TO 17

Kneading and molding were performed in the same way as in Example 2 using 2.33% by volume of activated carbon having a specific surface area of 1015 m$^2$/g and a limited amount of oil absorbed of 5.7 cc/cc, 7% by volume of lubricant Ro 2500, nylon 66 (CM 3001 N) as the base plastic, and each of the antioxidants shown in Table 5. The antioxidants used were as follows:

MDP: 2,2'-methylenebis-(6-tert.-butyl-4-methylphenol)
BBM: 4,4'-butylenebis-(6-tert.-butyl-3-methylphenol)
WXR: 4,4'-thiobis-(6-tert.-butyl-3-mcthylphenol)

Table 5

| Samples (Examples) | Antioxidants | Initial Tensile Properties | | Tensile Properties After Deterioration * | |
|---|---|---|---|---|---|
|  |  | Tensile Strength (Kg/cm$^2$) | Elongation (%) | Tensile Strength (Kg/cm$^2$) | Elongation (%) |
| 6 | None | 565 | 3.5 | 240 | 1.5 |
| 14 | MDP (0.8) | 712 | 4.2 | 296 | 2.0 |
| 15 | BBM (0.8) | 662 | 4.0 | 335 | 2.2 |
| 16 | MDP (0.4) WXR (0.4) | 607 | 4.1 | 317 | 2.4 |

Table 5-continued

| Samples (Examples) | Antioxidants | Initial Tensile Properties | | Tensile Properties After Deterioration * | |
|---|---|---|---|---|---|
| | | Tensile Strength (Kg/cm²) | Elongation (%) | Tensile Strength (Kg/cm²) | Elongation (%) |
| 17 | BBM (0.4) MDP (0.4) | 673 | 4.4 | 324 | 2.2 |

* The deterioration was carried out in a hot air circulating type dryer at 180°C for 4 days.

EXAMPLE 18

In Example 6, the nylon 66, activated carbon, lubricant and as a fire retardant, 10% by volume of Decrolan-4070 (a halogenated alicyclic hydrocarbon-type fire retardant, a product of Hooker Chemical Company) and 0.4% by volume of potassium bichromate were well mixed and molded. The results are shown in Table 6.

EXAMPLE 19

In Example 18, 10% by volume of Decrolan-4070 and 0.4% by volume of potassium bichromate were mixed in advance with the nylon 66, and extruded by a biaxial screw extruder and then pelletized. The pellets were then mixed with 2.5% by volume of the activated carbon and 7% by volume of the lubricant, and the mixture was molded in the same way as in Example 18. The results are shown in Table 6.

EXAMPLE 20

Example 2 was repeated except that 10% by volume of hexabromobenzene and 4% by volume of Sb$_2$O$_3$ were further added as a fire retardant. The results are shown in Table 6.

Table 6

| Samples | Combustion Test | | Amount of Wear (mm) |
|---|---|---|---|
| | Burning Time After Igniting for 10 Seconds | Burning Time After Igniting for 10 Seconds Again | |
| Comparative Example 2 (nylon 66) | 0.3 sec | 5 sec | 7.5 |
| Example 6 | Continued to burn at a rate of 0.68 inch/min | | 3.3 |
| Example 18 | 0.7 sec | 8 sec | 3.8 |
| Example 19 | 0.9 sec | 10 sec | 4.0 |
| Comparative Example 1 | Continued to burn at a rate of 0.89 inch/min | | Burned |
| Example 2 | Continued to burn at a rate of 0.95 inch/min | | 3.5 |
| Example 20 | 1 sec | 20 sec | 4.8 |

As shown above, lubricant-containing plastic compositions having markedly improved wear resistance and increased fire retardancy can be obtained in accordance with the process of the present invention.

EXAMPLE 21

Molding was performed in the same way as in Example 2 using Duracon M90-02 (a polyacetal copolymer, a product of Polyplastic Kabushiki Kaisha), 3% by volume of polyethylene powder having a specific gravity of 1.3 m²/g and a limit amount of oil absorbed of 0.7 cc/cc (Hizex Million, a product of Mitsui Petrochemical Industries, Ltd.), 10% by volume of lubricant oil Ro 2500, and 1% by volume of an antistatic agent (Sumistat SP-301 or PP-101, a nonionic surfactant, a product of Sumitomo Chemical Co., Ltd.). The results of the antistatic test determined by means of an honestmeter are shown in Table 7.

Table 7

| Antistatic Agent | Half Life Period (seconds) | Decay Ratio After 3 Minutes |
|---|---|---|
| M90-02 (not containing lubricant) | 82 | 0.25 |
| M90-02 (containing lubricant, but not an antistatic agent) | 789 | 0.73 |
| SP-301 | Less than 1 | 0.05 |
| PP-101 | 9 | 0.04 |

While the invention has been described in detail and with reference to specific embodiments thereof, it will be apparent to one skilled in the art that various changes and modifications can be made therein without departing from the spirit and scope thereof.

What is claimed is:

1. A lubricant-containing synthetic resin composition prepared by pre-mixing 2 to 40% by volume of a lubricant consisting of at least one lubricant oil, oiliness-increasing agent or a mixture thereof with at least one carrier which is an organic or inorganic powder having a melting point or a melting viscosity higher than the molding temperature of a base thermoplastic synthetic resin, a specific surface areas of at least 0.3 m²/g and a limited amount of oil absorbed of at least 0.2 cc per 1 cc of said carrier, and then mixing the resulting mixture with the base synthetic resin, or mixing said lubricant, carrier and base synthetic resin simultaneously in a kneader having multiaxial mixing means and then molding the resulting mixture, the amount of said lubricant added, expressed as the ratio of the volume of said lubricant to the volume of said carrier, being not more than 10.0 times the limited amount of oil absorbed by said carrier.

2. The composition of claim 1 wherein said composition contains at least one fire retardant.

3. The composition of claim 1 wherein said composition contains at least one antistatic agent.

4. The composition of claim 1 wherein said composition contains at least one antioxidant.

5. The composition of claim 2 wherein said composition contains at least one antioxidant.

6. The composition of claim 2 wherein said composition contains at least one antistatic agent.

7. The composition of claim 6 wherein said composition contains at least one antioxidant.

8. The composition of claim 3 wherein said composition contains at least one antioxidant.

9. The composition of claim 1 wherein a heated mixer including at least two rotors is used for said mixing.

10. The composition of claim 1, wherein said multiaxial mixing means is effected by at least 2 rotors.

11. The composition of claim 1, wherein said multiaxial mixing means is effected by at least 2 screws.

12. The composition of claim 10 wherein said rotors mesh each other.

13. The composition of claim 1, wherein at least two of said mixing means rotate in different directions.

14. The composition of claim 13, wherein said two mixing means rotate at a speed of at least 7 revolutions per minute.

15. The composition of claim 14, wherein said speed is at least 20 revolutions per minutes.

16. The composition of claim 1, wherein said kneader is a continuous-type kneader.

17. The composition of claim 1, wherein said kneader is a screw-type extruder with screws rotating in different directions.

18. The composition of claim 11, wherein said screws have a ratio of their length to their diameter of at least 20.

19. The composition of claim 1, wherein said oiliness-increasing agent is selected from the group consisting of a saturated fatty acid, an unsaturated fatty acid, a fatty acid ester, an aliphatic amide, a metal soap and a higher alcohol.

20. The composition of claim 1, wherein said carrier is selected from the group consisting of synthetic resins, carbon, metal oxides, metal nitrides, metal powders, sulfides and finely divided powders of calcium carbonate, magnesium carbonate, clay, talc, silica, silicates, mica, quartz, diatomaceous earth, asbestos, aluminum hydroxide, alumina and acid clay.

21. The composition of claim 1, wherein said base thermoplastic synthetic resin comprises at least one resin selected from the group consisting of polyethylene, polypropylene, acrylonitrile/butadiene/styrene copolymer, polycarbonate, polyacetal, polyamides, polyphenylene oxide, polybutylene terephthalate, polyethylene terephthalate, polyphenylene sulfide and polystyrene.

22. The composition of claim 2, wherein said fire retardant is selected from the group consisting of phosphoric acid esters, halogenated aliphatic hydrocarbons, halogenated aromatic hydrocarbons, halogenated alicyclic hydrocarbons, organotin compounds, and inorganic compounds.

23. The composition of claim 3, wherein said fire retardant is a reactive type fire retardant selected from the group consisting of tetrachlorophthalic anhydride, tetrabromophthalic anhydride, tetrabromo bisphenol A, bis-β-chlorethyl vinyl phosphate, tribromophenyl allyl ether, tribromophenol, tribromoaniline dibromopropanol, and bisphenol S.

24. The composition of claim 3, wherein said antistatic agent is selected from the group consisting of anionic compounds, cationic compounds, amphoteric compounds, polyalkylene ether adducts of carboxylic acids, alcohols or phenol of the alkyl ether type, of the alkyl ester type or of the polyethylene imine type, polyalkylene ether adducts of polyamides, acid amides and inorganic compounds.

25. The composition of claim 4, wherein said antioxidant is selected from the group consisting of phenolic compounds, amines, hydroxy and trihydroxybenzenes, benzaphenones, sulphur compounds and organophosphorous compounds.

* * * * *